(12) United States Patent
Kashikar et al.

(10) Patent No.: US 8,437,808 B2
(45) Date of Patent: May 7, 2013

(54) APPARATUS AND METHODS FOR POWER MANAGEMENT ON MOBILE DEVICES

(75) Inventors: Anand Kashikar, Sunnyvale, CA (US); Vivek Shah, Fremont, CA (US); Wen Zhao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 12/772,390

(22) Filed: May 3, 2010

(65) Prior Publication Data
US 2011/0268000 A1  Nov. 3, 2011

(51) Int. Cl.
*H04M 1/00* (2006.01)
*H04B 1/38* (2006.01)

(52) U.S. Cl.
USPC ............ 455/572; 455/435.2; 455/435.3; 370/312; 370/342; 713/340

(58) Field of Classification Search ........... 455/435.2, 455/435.3, 522, 552.1, 572, 574; 370/312, 370/432, 473, 475; 713/340
See application file for complete search history.

(56) References Cited

U.S. PATENT DOCUMENTS

| | | | |
|---|---|---|---|
| 7,016,320 B1 * | 3/2006 | Petersson et al. | 370/331 |
| 8,032,139 B2 * | 10/2011 | Oommen et al. | 455/435.2 |
| 8,131,220 B2 * | 3/2012 | Erceg et al. | 455/63.1 |
| 8,135,443 B2 * | 3/2012 | Aleksic et al. | 455/574 |
| 2010/0022243 A1 | 1/2010 | Oommen et al. | |

FOREIGN PATENT DOCUMENTS

| | | |
|---|---|---|
| KR | 10-2008-0037151 A | 4/2008 |
| KR | 10-2010-0011507 A | 2/2010 |

* cited by examiner

*Primary Examiner* — Tuan H Nguyen

(57) ABSTRACT

Various embodiments for providing enhanced power savings in mobile computing devices are described. In one or more embodiments, a mobile computing device may monitor the battery power level remaining. The mobile computing device may select a wireless connection type for an application based on Quality of Service (QoS) requirements of the application and the amount of battery power remaining. The mobile computing device may switch the application from a higher QoS wireless connection type to a lower QoS wireless connection type when the battery power falls below a threshold. Other embodiments are described and claimed.

11 Claims, 4 Drawing Sheets

APPARATUS AND METHODS FOR POWER MANAGEMENT ON MOBILE DEVICES

BACKGROUND

A mobile computing device, such as a combination handheld computer and mobile telephone, or smart phone, generally may provide voice and data communication functionality, as well as computing and processing capabilities. In order to provide communication functionality, the device may need to search for and maintain multiple types of wireless signal connections. Different wireless connections require different amounts of battery power and may consume battery power at different rates. Further, different types of wireless activity may consume battery power at different rates, and/or may require specific quality of service (QoS) criteria. Accordingly, there may be a need for an improved apparatus and methods for providing enhanced power savings while maintaining communication services.

DETAILED DESCRIPTION

Various embodiments are directed to providing enhanced power savings on mobile devices, in particular, battery power savings. In one or more embodiments, a mobile computing device may include several radios that may provide several types of wireless connections. The mobile computing device may monitor the remaining battery power, which wireless applications are in use, and what quality of service (QoS) is needed by the applications. The mobile computing device may then, for example, switch an application to a different radio or wireless communication type when the battery power level drops below a threshold, or may disable a radio or wireless communication type altogether.

Figure 1:
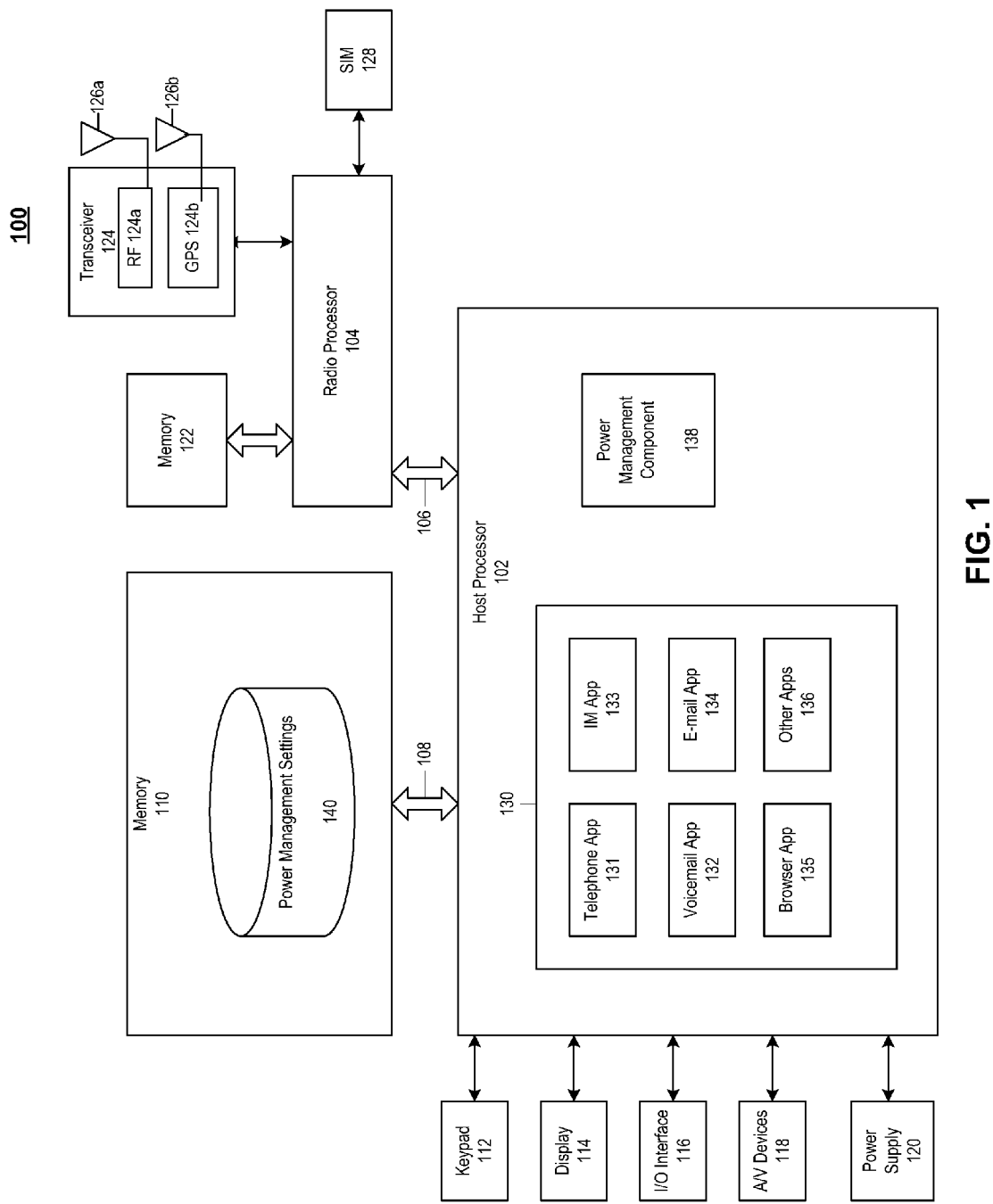
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, but are not limited to, for example, Palm® products such as Palm® Treo™ and Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual or multi-processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different wireless connection types, e.g. different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, in various embodiments some portion or the entire transceiver module 124 may be included on the same integrated circuit as the radio processor 104. The embodiments are not limited in this context.

In various embodiments, the transceiver module 124 may comprise one or more transceivers or components arranged to support voice and/or data communications for the wireless network systems or protocols as previously described. For example, the mobile computing device 100 may comprise one or more radio frequency (RF) transceivers 124a supporting voice communication (e.g., CDMA, GSM, UMTS, WCDMA), WWAN data communication (e.g., EVDO, EVDV, CDMA/1xRTT, GSM/GPRS, EDGE, HSDPA), WLAN data communication (e.g., WiFi, WiMAX), and/or WPAN data communication (e.g., Infrared protocols, Bluetooth®, IR, EMI) in accordance with the described embodiments. The transceiver module 124 may further comprise a GPS transceiver 124b supporting position determination in accordance with the described embodiments.

The mobile computing device 100 may comprise an antenna system 126 coupled to the radio processor 104 through the transceiver module 124. The antenna system 126 may transmit and/or receive electrical signals and may comprise or be implemented as one or more internal antennas and/or external antennas tuned for operating at one or more frequency bands. As shown, the antenna system 126 may comprise one or more antennas 126a connected to one or more RF transceivers 124a supporting voice and/or data communications in accordance with the described embodiments. The antenna system 126 may further comprise a GPS antenna 126b connected to the GPS transceiver 124b supporting position determination in accordance with the described embodiments.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may use any suitable OS in accordance with the described embodiments such as a Palm OS®, Palm OS® Cobalt, Palm® WebOS™, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

As shown in FIG. 1, the mobile computing device 100 may comprise or implement several applications 130. The applications 130 may comprise, for example, a telephone application 131 such as a cellular telephone application, a Voice over Internet Protocol (VoIP) application, a Push-to-Talk (PTT) application, and so forth. The applications 130 may further comprise a voicemail application 132, an instant messaging application 133, an e-mail application 134, a browser application 135, and other applications 136. Applications 130 generally may allow a user to accomplish one or more specific tasks. Examples of other applications 136 may include, without limitation, one or more messaging applications (e.g., telephone, voicemail, facsimile, e-mail, IM, SMS, MMS, video conferencing), personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the applications 130 may provide one or more graphical user interfaces (GUIs) to communicate information between the mobile computing device 100 and a user. In some embodiments, applications 130 may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Applications 130 may generally each have a preferred set of Quality of Service (QoS) criteria, that, when enforced, provide optimal performance for the application. Some applications, however, may still be able to operate with lower QoS criteria, although performance may be affected.

As shown in FIG. 1, the mobile computing device 100 may comprise or implement a power management component 138. Power management component 138 may be in communication with host processor 102 and/or radio processor 104. Power management component 138 may monitor the battery power level of power supply 120. In accordance with the battery power level, power management component 138 may select a particular wireless connection type for an application 130 to use. Wireless connection types may include, for example, an infrared connection, a Bluetooth connection, a wireless LAN connection, a GSM connection, a CDMA connection, a WCDMA connection, other 2G or 3G connections, etc. Power management component 138 may consider quality of service (QoS) requirements of the application 130 when selecting a wireless connection type. In an embodiment, power management component 138 may detect when the battery power level falls below a threshold, and then may assign the application 130 to a different wireless connection type that consumes less power. In some cases, power management component 138 may terminate the application, and/or disable the wireless connection type until the battery is recharged.

Power management component 138 may use power management settings 140, which may be stored in memory 110. Power management settings 140 may store information that associates a battery power level with actions taken to preserve or extend battery life. In some embodiments, different battery power level thresholds may trigger different actions. For example, each wireless connection type may have its own threshold below which the connection is disabled. Similarly, each application may have its own threshold below which the application is switched to a lower QoS connection.

Figure 2:
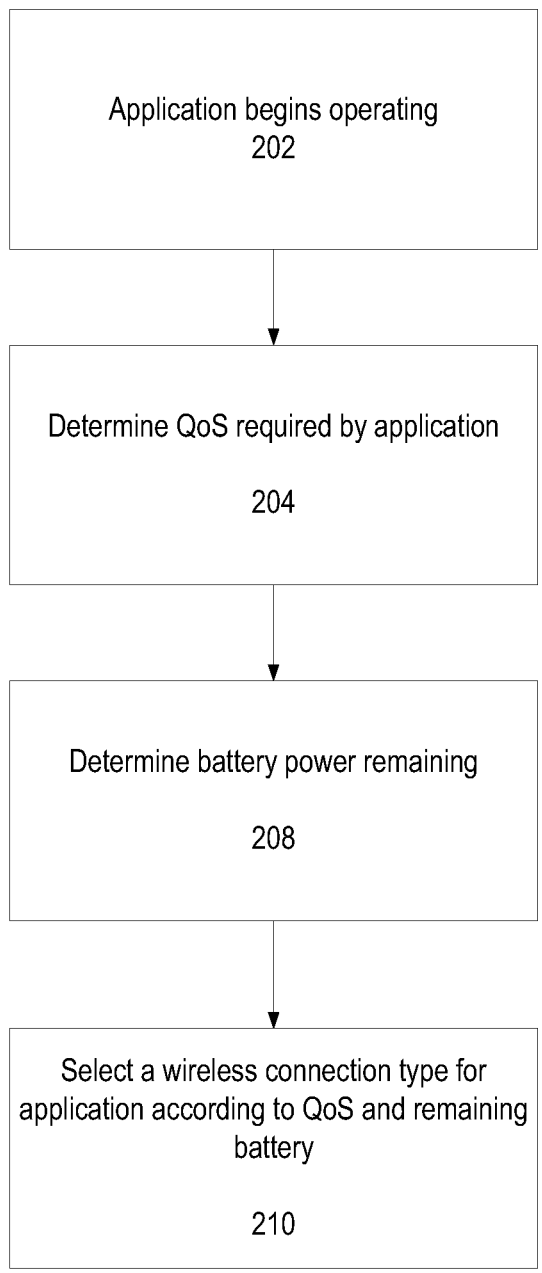
FIG. 2 illustrates a logic flow in accordance with one or more embodiments.

FIG. 2 illustrates a logic flow 200 in accordance with one or more embodiments. Logic flow 200 may be representative of the operations executed by one or more embodiments described herein, such as by mobile computing device 100, with host processor 102, and radio processor 104. As shown in logic flow 200, in block 202, an application 130 begins operating via host processor 102.

In block 204, power management component 138 may determine the QoS requirements of application 130. For example, an application that requires primarily a one-way connection, such as telephone app 131, e-mail application 134, or browser 135 presenting static web pages, may have lower QoS requirements regarding bandwidth and latency, for example. An interactive application, or one that otherwise requires a two-way connection may have higher requirements for bandwidth, latency and reliability, for example. Such applications may include, for example, web browser application 135 displaying a video, an application using real-time audio and/or video, networked games, etc. Higher QoS requirements may correlate with faster battery consumption.

In block 208, power management component 138 may determine what percentage of battery power remains.

In block 210, power management component 138 may select a radio, and wireless connection type, for the application in accordance with the QoS requirements and the remaining battery power. In some embodiments, power management component 138 may poll radio processor 104 to determine whether the application can be run using the application's preferred QoS. For example, for a high QoS application, such as an application using real-time video, if the battery power level is above a threshold, power management component 138 may allow the application to use WCDMA or another wireless connection that consumes battery power relatively quickly. If, however, the battery power level is below a threshold, for example, 30%, power management component 138 may either force the application to use a lower QoS wireless connection, such as GSM, or may prevent the application from operating altogether.

Figure 3:
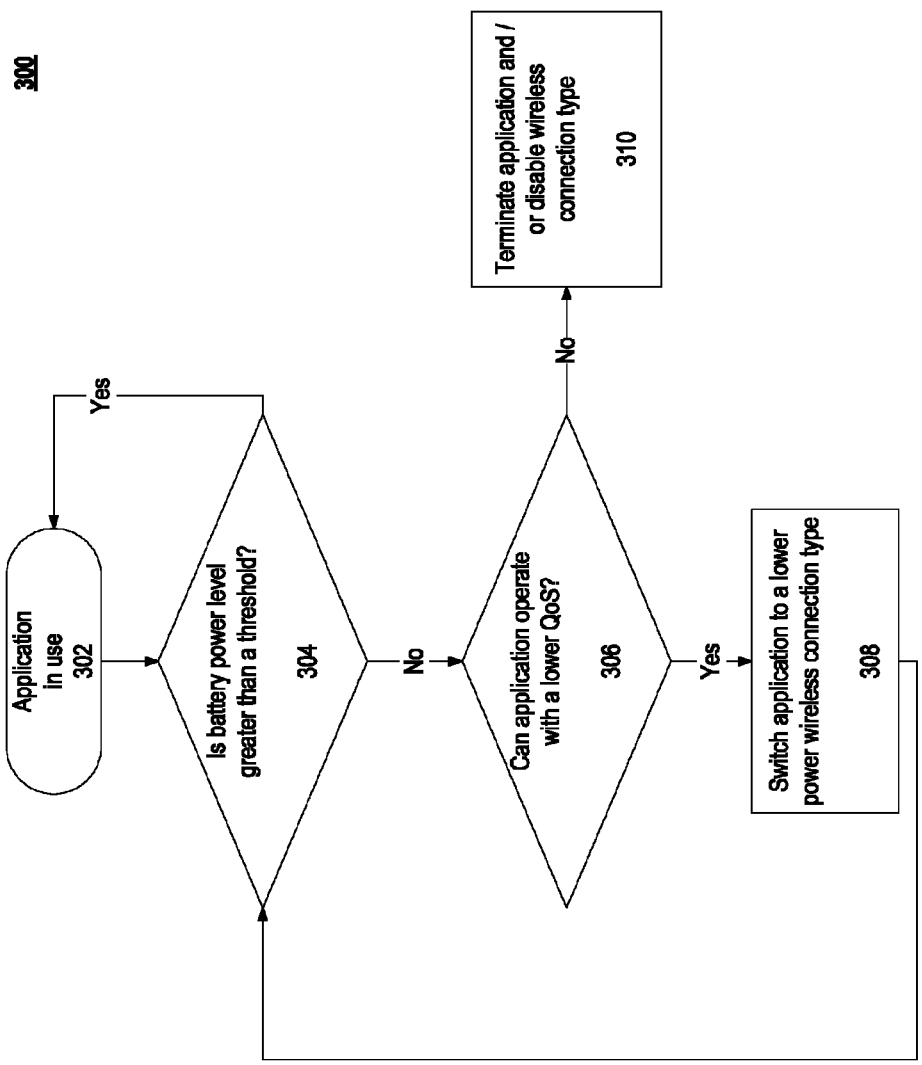
FIG. 3 illustrates a logic flow in accordance with one or more embodiments.

FIG. 3 illustrates a logic flow 300 in accordance with one or more embodiments. Logic flow 300 may be representative of the operations executed by one or more embodiments described herein, such as by mobile computing device 100, with host processor 102, and radio processor 104. Logic flow 300 may apply when one or more applications that use wireless connections are already in operation.

As shown in logic flow 300, in block 302, an application is already in operation via host processor 102. In block 304, power management component 138 may monitor the battery power level to determine if the level is greater than a threshold.

In block 306, when the battery power level is below a threshold, power management component 138 may determine whether the application can operate at a lower QoS. Power management component 138 may make this determination, for example, from power management settings 140, or from the application itself. In an embodiment, power management component 138 may send a power level to an application processor, such as host processor 102. If the battery power level is above the threshold, the application may continue to operate with the radio and wireless connection type currently in use.

In block 308, if the application can operate at a lower QoS, power management component 138 may switch the application to a radio or wireless connection type that uses less power and has lower QoS settings.

In block 310, if the application cannot operate at a lower QoS than its current state, power management component 138 may terminate the application. In some cases, the radio or wireless connection type may be temporarily disabled so that no other application may use it until the battery power level is recharged above the threshold. For example, if the battery power level falls below 10%, then all Bluetooth communication may be disabled.

Figure 4:
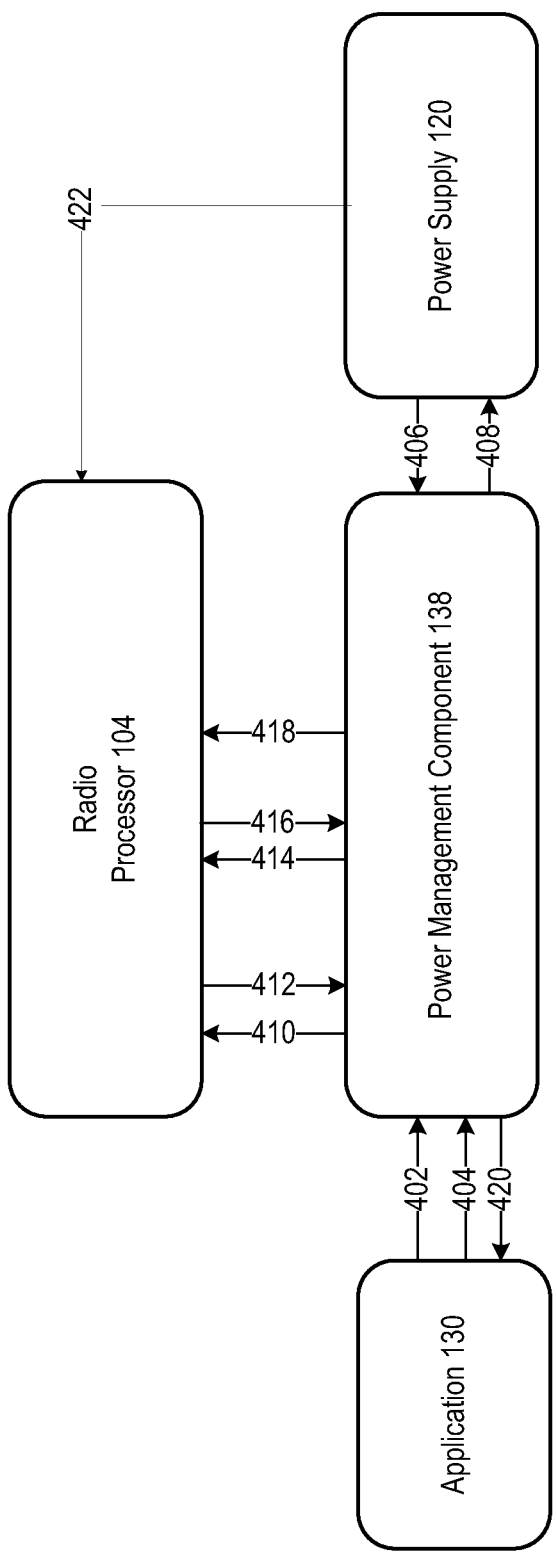
FIG. 4 illustrates one embodiment of a logic diagram.

FIG. 4 illustrates a logic diagram 400. The logic diagram 400 may illustrate one or more interfaces that may employ various techniques to exchange information between the elements of the mobile computing device 110, such as those shown and described with reference to the mobile computing device 110 of FIG. 1. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In the illustrated embodiment shown in FIG. 4, an application 130 may generate and send a request 402 to open and use a wireless connection type to power management component 138. In an embodiment, application 130 may send QoS requirements as part of request 402, or separately as a message 404.

Power management component 138 may determine what percentage of battery power remains by sending a request 406 to power supply 120. Power supply 120 may send a response 408 with the percentage of remaining battery power. In an embodiment, power supply 120 may periodically send response 408 automatically, without being polled first.

Power management component 138 may poll radio processor 104 with a request 410 to determine whether application 130 can be run using the application's preferred QoS and requested wireless connection type. Radio processor 104 may response with a response 412 that allows or denies the connection.

Power management component 138 may periodically poll radio processor 104, independently of a specific application request, with a poll 414 to determine what wireless connection types are available given a current battery power level. Radio processor 104 may respond with a response 416 that may contain an indication of which wireless connection types are no longer available for use because the battery power level is too low. In an embodiment, radio processor 104 may receive power indication messages 422 directly from power supply 120. Then radio processor 104 may notify power management component 138 with response 416 when the battery power level is too low to allow applications having certain QoS requirements to operate or to continue operating.

When the battery power level drops below a threshold, power management component 138 may change the wireless connection type for application 130 by sending a message 418 to radio processor to change the radio used, the QoS settings or otherwise alter the wireless connection to conserve power. Power management component 138 may also inform application 130 via a message 420 that the wireless connection type has changed.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Any reference to "one embodiment" or "an embodiment" may mean that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

The described embodiments illustrate exemplary implementations, and the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, terms such as "processing," "computing," "calculating," "determining," or the like, may refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a radio processor, to connect to at least one radio providing at least two wireless connection types, wherein a first wireless connection type consumes power at a different rate from a second wireless connection type;
a host processor, to operate an application that uses the radio;
a battery to supply power to the radio processor and the host processor; and
a power management component to:
select a wireless connection type for the application according to a Quality of Service (QoS) requirement of the application and an amount of power remaining in the battery,
monitor a battery power level, and
cause the application to change to a different wireless connection type having different QoS parameters when the battery power level falls below a threshold.

2. The apparatus of claim 1, a wireless connection type comprising at least one of: a short range wireless connection, a wireless network connection, a global system for mobile communications (GSM) connection, a code division multiple access (CDMA) connection, or a wideband code division multiple access (WCDMA) connection.

3. The apparatus of claim 1, the power management component to cause the application to terminate when the battery power level falls below a threshold.

4. The apparatus of claim 1, the power management component to disable the wireless connection type when the battery power level falls below a threshold.

5. The apparatus of claim 1, the radio processor to notify the power management component when the battery power level is too low to allow applications having certain QoS requirements to operate or to continue operating.

6. The apparatus of claim 1, the power management component to prevent the application from operating if the battery power level is below a threshold.

7. A non-transitory machine-readable storage medium comprising instructions that, when executed, cause a mobile computing device to:
- begin operating an application on the device to:
- determine a QoS requirement of the application;
- determine a battery power level on the device;
- select a first wireless connection type for the application according to the QoS requirement of the application and the battery power level;
- monitor a power level of the battery; and
- cause the application to change to a second wireless connection type operating at a lower QoS than the first wireless connection type when the battery power level falls below a threshold.

8. The non-transitory storage medium of claim 7, a wireless connection type comprising at least one of: a short range wireless connection, a wireless network connection, a global system for mobile communications (GSM) connection, a code division multiple access (CDMA) connection, or a wideband code division multiple access (WCDMA) connection.

9. The non-transitory storage medium of claim 7, further comprising instructions that, when executed, cause the mobile computing device to:
- cause the application to terminate when the battery power level falls below a threshold.

10. The non-transitory storage medium of claim 7, further comprising instructions that, when executed, cause the mobile computing device to:
- disable the wireless connection type when the power level falls below a threshold.

11. The non-transitory storage medium of claim 7, further comprising instructions that, when executed, cause the mobile device to:
- prevent the application from operating if the battery power level is below a threshold.

* * * * *